March 7, 1939.  R. PEALE  2,150,103

METHOD AND MECHANISM FOR SEPARATING INTERMIXED DIVIDED MATERIALS

Original Filed April 13, 1927  6 Sheets-Sheet 3

INVENTOR.
R. Peale
BY John D. Morgan
ATTORNEYS.

March 7, 1939.  R. PEALE  2,150,103
METHOD AND MECHANISM FOR SEPARATING INTERMIXED DIVIDED MATERIALS
Original Filed April 13, 1927  6 Sheets-Sheet 4

March 7, 1939. R. PEALE 2,150,103
METHOD AND MECHANISM FOR SEPARATING INTERMIXED DIVIDED MATERIALS
Original Filed April 13, 1927    6 Sheets-Sheet 5

Patented Mar. 7, 1939

2,150,103

UNITED STATES PATENT OFFICE 2,150,103

METHOD AND MECHANISM FOR SEPARATING INTERMIXED DIVIDED MATERIALS

Richard Peale, St. Benedict, Pa., assignor, by mesne assignments, to Peale-Davis Company, Wilmington, Del., a corporation of Delaware Application April 13, 1927, Serial No. 183,262
Renewed July 8, 1938

11 Claims. (Cl. 209—469)

The invention relates to a novel and useful process and mechanism for separating intermixed, divided materials, and more particularly to such a process and mechanism especially adapted and capacitated for separating intermixed divided materials wherein the pieces or particles vary relatively very greatly in size but vary relatively little in their specific gravities.

Objects and advantages of the invention will be set forth in part hereinafter, and in part will be obvious herefrom, or may be learned by practicing the invention; such objects and advantages being realized and attained by the steps, and through the instrumentalities, pointed out in the appended claims.

The invention consists in the steps, processes, parts, combinations, constructions and arrangements herein shown and described.

The accompanying drawings, herein referred to and constituting a part hereof, illustrate one embodiment of the invention and the preferred manner of practicing the same, said drawings together with the description serving to illustrate the principles of the invention.

The invention is directed to a method and mechanism for separating intermixed divided materials, the term "divided" being used to designate broken, fragmentary, granular, pulverulent or other materials comprising separated parts or pieces of different kinds of materials. The invention is more particularly directed, however, to effecting automatic separation of such mixtures of materials wherein the various pieces of the different kinds of materials vary very greatly in size, while varying relatively very little in their specific gravities.

This presents a problem of great practical difficulty, due to the wide range of variations in the sizes of the pieces of materials and the relatively small variance in their specific gravities. Separating work of this kind requires practically an entirely different process and mechanism or apparatus from the separation of materials which are very finely pulverized, which vary very widely in their specific gravities, or which are very carefully and extensively sized prior to the separating process.

The terms "lighter" and "heavier" as used hereinafter will be understood as applying to the specific gravities of the various intermixed, divided materials, and not to the difference in mass of particular pieces of various sizes.

One kind of intermixed, divided materials, which the invention is especially capacitated to successfully separate is a mixture of coal, "bony" and rock, and other impurities, as it comes from the mine, the rock and other impurities being separated from the coal by my invention entirely automatically, and without previous sizing of the materials except as to crushing or removal of the very largest lumps.

The invention further provides in addition to the capacities enumerated a very compact structure and a relatively small table, requiring an exceedingly small expenditure of power for the driving of the table, and especially for creating the material-buoying air current passing through the bed, while maintaining a very high output of successfully cleaned or separated material.

According to previous commercial practice, except by the cleaning tables disclosed in and covered by certain related copending applications, it has been necessary to very closely size the coal by preliminary screening before attempting the automatic separation of the intermixed coal, bony and rock.

As an example of necessary previous commercial screening preparatory to separating: All sizes above two inches were screened out; from two inches to 1½ inches were screened as to the next size; then from 1½ inches to 1 inch; from 1 inch to ½ inch; from ½ inch to ¼ inch; from ¼ inch to ⅛ inch; from ⅛ inch to 1/16 inch; from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating tables, as described in the preceding paragraphs. I am able on this one table to practically completely separate the coal, rock, bony and other impurities from three inches in dimension down to the finest dust.

My invention is applied to the progressive stratification and separation of a continuous and forwardly flowing bed of intermixed divided materials, such as the mixture of unsized coal, bony and rock, the bed of materials being supported upon an air-pervious table, a blast of air being driven from beneath the table upwardly through the bed of forwardly progressing materials, the blast varying or pulsating between a very small volume or intensity up to a relatively large volume or intensity. The table at the same time is longitudinally reciprocated to aid the separating action and the forward travel of the bed of materials gradually undergoing separation, and to mechanically progress the separated heavier material, which has settled upon the table, by friction and inertia toward a place of delivery. The gradation of the force of the buoying air current and the action of the table structure cooperate in the novel manner hereinafter described to accomplish, in connection with other instrumentalities, the desired result.

The invention provides broadly for feeding on the intermixed materials at a locus which is at or near the rear end of the table, and preferably entirely across the end, at a rate which is regulated or controlled to build up at the beginning, and thereafter to continuously maintain upon the table a bed of materials of substantially uniform thickness, which moves gradually forwardly over the table, and is progressively stratified and separated. The materials undergo progressive separation, due to the combined air and mechanical action as they move forwardly, gradually approaching complete separation, which is effected before the separated materials are delivered from the table. With many kinds of materials the separating process progresses concurrently with all sizes of particles or pieces, and the stratified and separated discharged products will be of all sizes entirely throughout the length or extent of the discharge edge.

In the preferred embodiment, the heavier material after it settles upon the table, is impelled by inertia and friction as quickly as possible to the side edge of the table, while the lighter superior and buoyant stratum of material is permitted to flow unconstrainedly forwardly along the bed or table to delivery at the forward edge thereof. The table is preferably upwardly and forwardly inclined, and is also preferably upwardly inclined in the direction of the impulsion of the settled heavier material out of and to the side of the bed, the amount or degree of inclination being regulable as desired or found most efficient.

In connection with these features, means are also provided for regulating the relative amount of feed across the rear end of the table, that is, to direct as great a volume as may be desired, toward the lower side of the table to increase the speed and efficiency of separation, or otherwise most efficiently vary the feed of the materials crosswise of the rear end of the table. The reciprocatory movement of the table is preferably a slow, upward and forward movement, and a quick and sudden return movement, although this may be varied widely in so far as concerns many features of the invention.

It will also be found desirable in operating on many kinds of materials, to provide the table with areas of different degrees of intensity of the pulsating air current; that is, the body of the table may have the varying or pulsating air current of a given intensity, and the forward end of the table may have the pulsating air current of a greater intensity.

As exemplarily and preferably embodied, so far as concerns the main features of the invention, the separating table comprises a proportionately narrow and fairly long air-pervious deck, which may be rectangular except at the forward end, constituting the discharge edge for the coal, or other lighter material. This forward edge is transversely arranged so as to give an exceedingly long spillage or delivery edge, and for this purpose the front end of the table may be angled laterally for quite a distance so that this spillage edge may be the full width of the table and also provide a rock discharge at the side thereof.

A series of parallelly-arranged separating partitions, which are inclined forwardly and from the rear end and the short side of the deck toward the opposite side, and toward the angled forward end of the table are provided to impel the settled rock and impurities out of the bed of materials as quickly as possible. The fed on materials may not only be regulated as to quantity to maintain a proper thickness of the bed progressively undergoing separation throughout the length of the table, but also to regulate the relative quantity fed across the table with respect to the transverse inclination thereof and the direction of travel of the rock.

The pulsating air current is preferably uniform throughout the main body of the bed, but has a greater intensity toward the forward end of the bed as the layer of deposited rock and other impurities grows thicker and thicker, due to the progression and final completion of the separating action.

It will be understood that the preceding general description, and the following detailed description as well, are exemplary and explanatory of the invention, but are not restrictive thereof.

Referring now in detail to the embodiment of the invention illustrated by way of example in the accompanying drawings, a table or deck 1 is provided with perforations 2, which in the present embodiment are practically uniform throughout the main body of the table, although this may be varied as desired. The deck or table 1 is supported at its edges upon a rectangular frame 3 (Figs. 1, 2, 5, 6 and 7) conforming to the shape and size of the main part of the table or deck 1, which frame 3 in turn is carried by the general table structure, which is mounted reciprocably on the stationary air-pressure chamber. This frame may conveniently be made of channel beams, and an additional supporting structure for the interior of the table throughout is provided. For this purpose, transverse supporting members 5, are supported at their ends on the flanges of the side channel bars 3, and extend across the table beneath and supporting the deck 1.

Means are preferably provided for inclining the table both forwardly and upwardly and also upwardly transversely in the direction of travel of the rock or other heavier material out of the bed and to the side of the table, the degree of inclination being variable. In the embodied form of said inclination-varying means, the channel frame 3 is hung within the reciprocable or vibratable table structure by means of screw-threaded supports. The general reciprocable or vibratable table structure (Figs. 1, 2, 3, 5 and 7) comprises external frame members, including a rear transverse member 20, and longitudinally-extending side members 21 and 22, and a forward transverse member 23.

Fixed to the inner faces of these members and extending upwardly therefrom are corresponding bed-retaining walls, a wall 25 extending along the rear end of the table, a wall 26 along the long side of the table, and a wall 27 along the short side thereof. The wall 26 has an extension 26ª along the angularly disposed forward end of the table, there being a special structure later to be described along the transverse spillage front edge of the table.

The frame 3 of the deck 1 is positionably supported from these side walls, as embodied, by means of bolts 34 passing through the deck 1 and the upper flanges of the frame members 3, at various points, the structure resting upon the bolt heads. The threaded upper ends of the bolts 34 pass through bracket plates 35, which plates are bolted or riveted to the side-walls of the table, and have horizontally-extending parts through which the bolts 34 pass. The bolts are provided with lock-nuts 36, by which the table and its frame can be raised or lowered to vary and regulate its inclination.

In the embodied form of supporting means for the longitudinally reciprocable table, the frame members 21 and 22 are pivotally supported at 39, 40, 41 and 42, respectively, upon four corresponding arms 44. These arms are pivoted at 45, 46, 47, 48, respectively, upon a stationary frame fixed to the stationary air chamber. This stationary frame has a rear-end reach 53, a front cross reach 54, and side reaches 55 and 56, mounted on the upper part of the vertical side and end walls of the stationary air chamber.

The pivotal supporting arms for the table are preferably inclined upwardly and rearwardly, so that the table has an upwardly and forwardly and downwardly and rearwardly reciprocating movement. The air chamber is stationary in the present construction and a flexible air-sealing member 59 is fastened to the reciprocating frame of the table and the stationary top frame of the air chamber to make an air-tight joint between the reciprocating table and the stationary air chamber.

Figure 8:
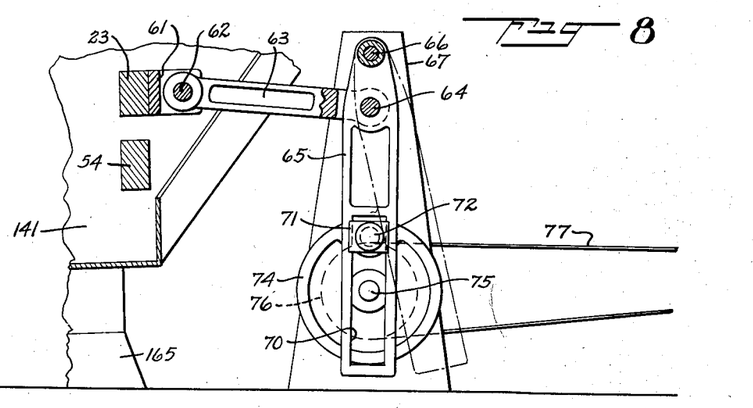
Fig. 8 is a fragmentary, vertical section, on an enlarged scale, taken on line 8—8 of Fig. 3.
Figure 9:
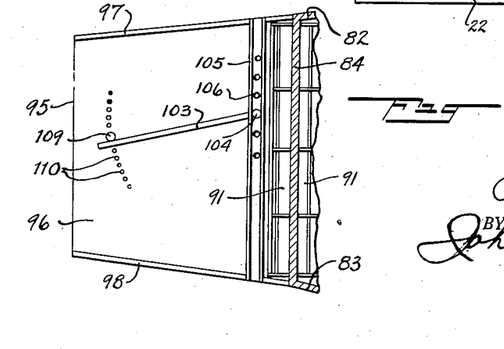
Fig. 9 is a fragmentary elevation, with parts in section looking from line 9—9 on Fig. 2.

The embodied form of means for reciprocating the table, as already indicated, comprises means for imparting a slow forward and rising movement and a quick rearward and falling movement to the table. As embodied, a bracket 61 is fixed to the forward transverse reciprocable frame 23, and pivotally connected thereto (Figs. 2, 3 and 8) at 62 is a link 63. Link 63 at its other end 64 is pivotally connected to an arm 65, which arm is pivotally supported from a horizontally-disposed shaft 66, carried on two supporting blocks 67 and 68. The embodied form of actuating means for this arm comprises a guideway 70 formed in the bottom of the arm, in which is reciprocably mounted a block 71, in which block is journaled a wrist pin 72, fixed on a disk 74. Disk 74 is fixed on a shaft 75, which shaft is journaled in the pedestal block 67. Fixed on shaft 75 is a driving pulley 76, which is driven by a belt 77.

With this particular form of actuating means, the motion of the actuating arm 65, and consequently of the table, is from rest at the rear end of the travel to a relatively rapidly increasing maximum at the middle of the stroke and again to rest at the opposite end thereof, and a relatively slow increase to a lesser maximum at the middle of the return stroke, and again to rest at the end of the stroke. It will be understood that this actuating means, and the particular movement employed, is exemplary and that other forms thereof may be used as desired.

Figure 10:
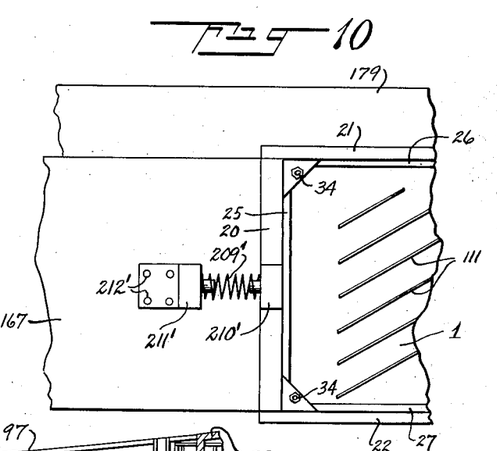
Fig. 10 is a fragmentary plan of the rear end of the table proper, showing a spring buffer device.

Suitable springs may be provided for absorbing the shock of the table drive and assisting in the return stroke. As embodied, (Fig. 10) a helical spring 209' is fixed to the rear wall 20 of the table through the block 210' mounted therein. The other end of the spring is fixed to the stationary air duct 167 through the bracket 211', the bracket being secured to the duct by bolts 212'.

In the embodied form of means for feeding on the intermixed divided materials to form and to maintain a continuous bed upon the table progressively undergoing stratification and separation forwardly of the table, suitable material-supplying means, such as a hopper 81 is provided. This hopper has vertical side walls 82 and 83, and downwardly and inwardly inclined front and rear walls 84 and 85 arranged transversely of the table. There is a transversely-disposed opening at the bottom of the hopper, and positioned therein is a variable-speed material-delivery mechanism, and as embodied this comprises a horizontally-disposed, parti-cylindrical plate 86, fixed to the bottom of the hopper wall 85. Within this plate and the opening is a transversely-disposed shaft 87, journaled in the side walls 82 and 83 of the hopper, and provided on the exterior thereof with a driving pulley 88. This pulley is shown driven from the belt 89 from a regulable and variable speed driving device, which may be of any standard or other suitable form.

A plurality of feeding plates 91 are fixed tangentially to the shaft 86 and extend outwardly therefrom, and rotate within the curved plate 86, and serve to feed out from the hopper predetermined portions of the intermixed materials, the amount of materials fed out being controlled by the speed of rotation of the mechanism.

Embodied with the conveying means for the materials between the hopper and the rear end of the table are devices for regulating the distribution of the intermixed materials transversely of the table. As embodied, a chute 95 is downwardly and rearwardly inclined, and has a bottom 96 and side walls 97 and 98. The lower edge of the chute is spaced above and approximately adjacent to, and extends substantially entirely across, the rear end of the table. The chute is supported by rods 99 from the structure above.

The means for directing the materials proportionately across the table as desired comprises a deflecting plate 103, having at the upper end thereof variably positionable pivotal mountings in a beam 105, which extends across the upper end of chute 95 and is supported on the side walls thereof. A pivot pin 104 is positionable in any one of a plurality of holes 106 in the bar 105 and extends into a hole in plate 103. A like pivot 107 is provided for the lower edge of the deflector plate 103 and this is likewise positionable in any one of a series of holes in the bottom 96 of the chute.

Means are provided also for angularly positioning the lower end of the deflector plate 103, and as embodied, a pin 109 is positionable in any one of a series of holes 110 formed in the bottom 96 of the chute. Thus both the transverse position of the plate 103, and its angle of inclination can be varied to deflect transversely of the table as may be desired the materials fed entirely along the rotating feed plates 91.

The embodied form of means for assisting in the separating operation and for impelling the settled heavier material out of the path of travel of the bed by friction and inertia, comprises a series of separating partitions 111, which rest upon and project upwardly substantially perpendicularly from the air-pervious deck 1, and are disposed forwardly and transversely from the short side of the table toward the long side thereof, and are preferably parallelly arranged throughout the body of the table. The separating partitions may be varied in shape and size as may be found most efficient for any particular kind or condition of intermixed materials to be separated. They may be varied in height or in their distances apart along the table, or they may be tapered longitudinally or otherwise changed as may be found most efficient for any particular case.

Figure 3:
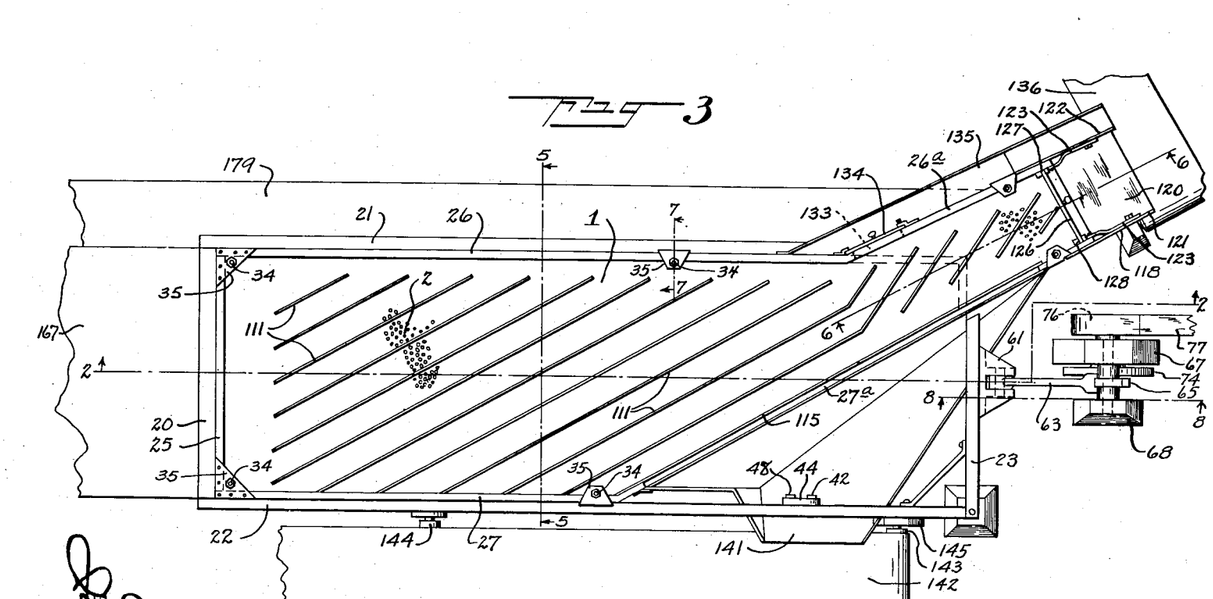
Fig. 3 is a full top plan corresponding to Fig. 2.
Figure 4:
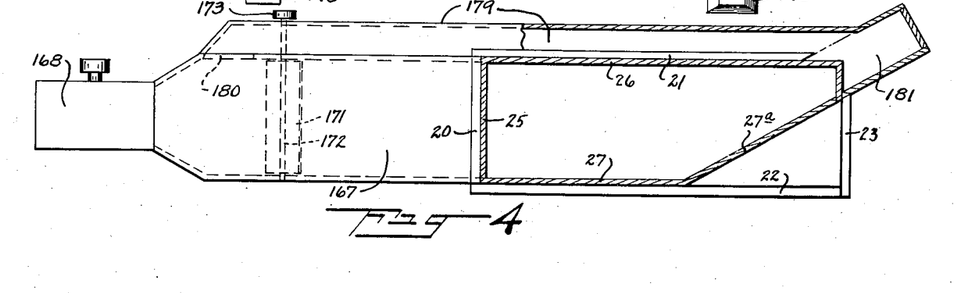
Fig. 4 is a partial top plan and a partial horizontal section on the line 4—4 of Fig. 1.
Figure 5:
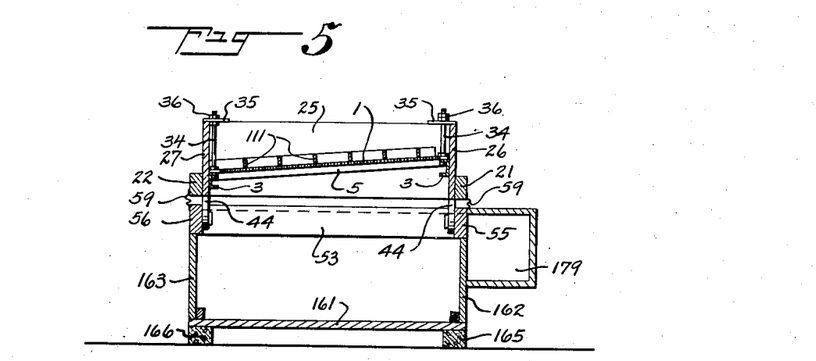
Fig. 5 is a vertical, transverse section taken on the line 5—5 of Fig. 3.
Figure 6:
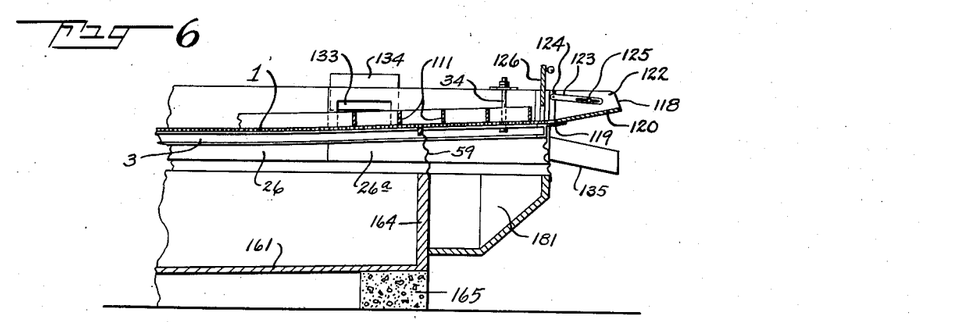
Fig. 6 is a vertical, longitudinal section taken on the line 6—6 of Fig. 3.
Figure 7:
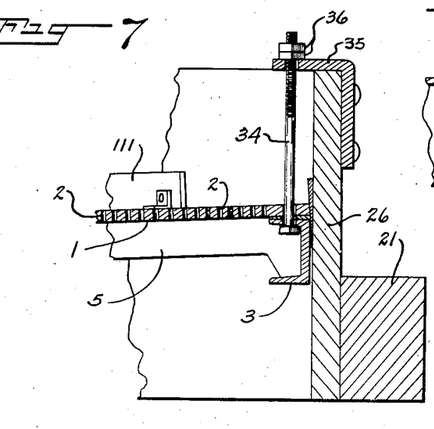
Fig. 7 is a fragmentary, vertical section, greatly enlarged, taken on the line 7—7 of Fig. 3.

These separating partitions as embodied abut upon the short side retaining wall 27, but are preferably spaced away from the rear retaining wall 25. They terminate short of the opposite side retaining wall 26, so as to provide a longitudinally disposed passageway between their ends and the retaining wall to permit the forward travel of the settled rock or other heavier material along this side edge. In the transversely-disposed forward end of the table, the separating partitions may be disposed at a sharper angle, and there is preferably free space between their rearmost ends and the contiguous forward spillage or discharge end of the table, as shown in Fig. 3.

It is of great importance in separating most materials to provide an extended discharge edge for the superior stratum of coal or other separated lighter material, and accordingly this front edge of the table is arranged at a long angle thereby avoiding any crowding of the material into a narrow part of the table and also obviating forcing the coal or other superior stratum of the table in a transverse direction. It is likewise highly advantageous with most materials to provide the full width of the table as a path for this unrestricted forwardly flowing superior stratum of coal, or other material. Accordingly the forward end of the table deck extends laterally a short distance so as to carry the stream of rock, or other settled material, sliding along the side edge of the bed to the forward end of the table to discharge, while giving the entire width of the table to the unrestricted stream of forwardly-flowing coal.

The spillage edge for the coal or lighter material is preferably provided with a vertically-disposed lip or wall 115, which may be of various heights for use with different kinds of material, or under different physical conditions of the materials, or other operating conditions. For this purpose the wall 115 may be removable and interchangeable with other similar walls of different heights.

Means are also provided for regulating the discharge of the rock or other heavier material (Figs. 2, 3 and 6) so as to regulate the height of the layer of rock to effect the most efficient separating action. In the embodied form thereof, at the forward or angled end of the table, means are provided for regulating the rate of discharge of the rock and for preventing any material above the rock from passing out. As embodied, a chute 118, having side walls 121 and 122, has its bottom 120 pivotally connected at 119 across the forward end of the table. This chute is vertically angularly positionable by suitable means, such as slotted bars 123, pivoted at 124 to the side walls of the table, and having bolt and slot connections 125 with the respective side walls 121 and 122 of the chute.

Cooperating with the foregoing is a vertically positionable gate 126, vertically disposed across this part of the table, and slidably mounted in guides 127 and 128 at either side of the forward end of the table. Thus the chute 118 may be raised or lowered to create a bed of the settled and separated rock or other heavier material of the desired thickness, and the gate 126 may be positioned to permit just the passage of this bed of material, while holding back anything thereabove.

Figure 1:
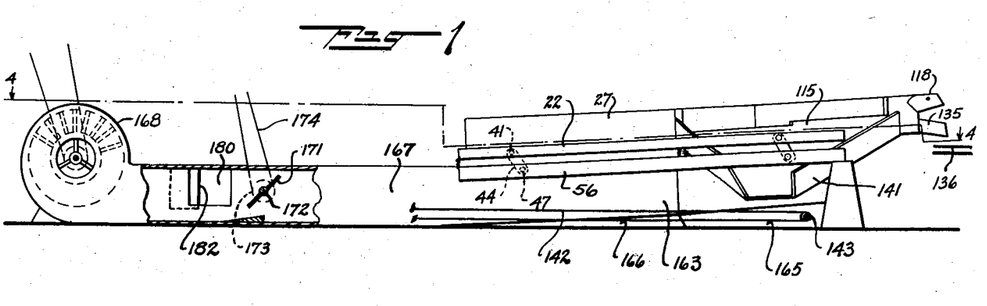
Fig. 1 is a side elevation of a mechanism constituting one embodiment of the invention.
Figure 2:
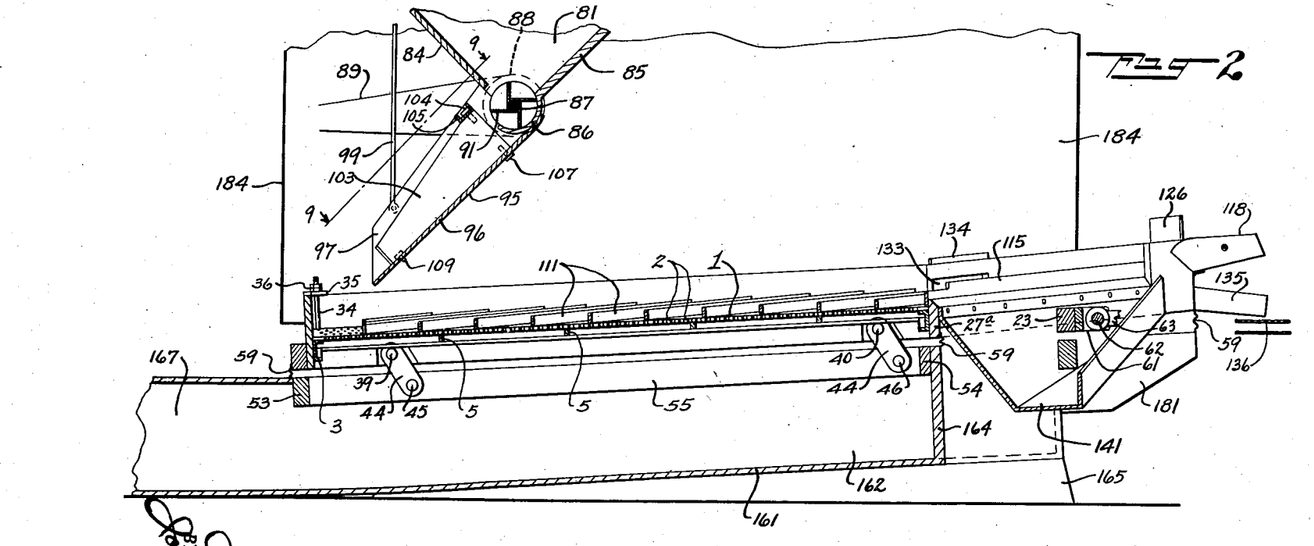
Fig. 2 is a central, vertical, longitudinal section, on an enlarged scale, of the mechanism at the right-hand end of Fig. 1 and is taken substantially on the line 2—2 of Fig. 3.

Auxiliary discharging means for the rock or other heavier settled material may be provided, and an embodiment of such means is shown in Figs. 2 and 3 of the drawings. As shown therein, a discharge opening 133 is provided in the side wall 26 or 26ª, and a vertically slidable and positionable gate 134 is provided for regulating the height of opening or passage above the table through the discharge opening 133 to permit the passage of a bed or layer of rock of the height desired. The opening 133 discharges into a chute 135, supported upon the table structure. Both the chute 128 and the chute 135 are shown discharging onto an endless traveling conveyor 136. A vertically swingable or adjustable gate may be provided for this chute to control the flow of rock similarly to the main chute if desired, and the form of means for controlling the flow of rock, and the depth of the bed of rock may be widely varied as desired in both, or all, discharge chutes.

Suitable means are provided for conveying away the separated coal from the discharge edge and for this purpose a chute 141 (Figs. 1, 2 and 3) is fixed to the discharge edge for the coal at the front edge of the table, and extends downwardly and transversely, and projects sidewise beyond the vibrating frame, and discharges onto an endless conveyor belt 142 running about guiding and supporting rollers 143 and 144 carried in suitable supports 145.

Figure 11:
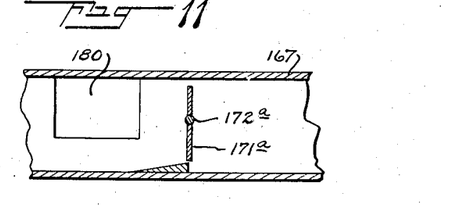
Fig. 11 is a fragmentary vertical section of a modified form of the device for creating a pulsating air current.

In accordance with certain features of the invention, a pulsating material separating and floating air current or action is created by suitable means, and in the embodied form thereof a stationary air chamber (Figs. 1 to 6) is provided, having a bottom 161, side walls 162 and 163 and a front end wall 164. This chamber is carried on supports 165 and 166, and is preferably forwardly and upwardly inclined. The rear end of the chamber communicates with a conduit 167, which supplies an air current or air under pressure from any suitable source of air supply such as a fan 168. The means for creating the pulsating air current, as embodied, comprises a rotating shutter 171, fixed on a shaft 172, journaled in the side walls of the conduit 167. The shutter is preferably power driven, as for instance by a pulley 173 and a belt 174 from any suitable driving means, and preferably also from a variable speed device. The shutter 171 as it rotates periodically and sequentially cuts off all the air between the fan and the table, and then gradually turns it on fully and again similarly cuts it off, giving a pulsating or wave-like materials floating or buoying air current upwardly through the bed of materials on the table, which varies between a minimum of practically nothing and a predetermined maximum, and back again to the minimum. In Fig. 11 the shutter 171a is shown of a type or form which will operate by the air blast alone, the shutter in this case being off center with respect to its shaft, and one edge thereof being slightly spaced away from the walls of the conduit so as to permit a slight passage between the shutter and conduit wall.

In accordance with one feature of the invention, a more intense pulsating and buoying air current is provided at the forward end of the table and especially at the narrower part thereof. In the embodied form of means for producing this current, an auxiliary air conduit 179 is provided leading out of an opening 180 in the conduit 167, and extending alongside the air chamber forwardly and terminating in an auxiliary air chamber 181 beneath the narrow angular forward end of the table. It will be understood that when the shutter 171 is closed the air pressure from the fan or other source will force the current of air through the conduit 179 to the front end of the table and as the shutter opens this current will decrease, and will rise again as the shutter closes. A slide 182 or other regulating device may be employed at the opening 180 or elsewhere to regulate the intensity of action of this air current.

A suitable dust enclosure and collecting device of any suitable form may be employed, and this is indicated generally by reference 184.

Figure 12:
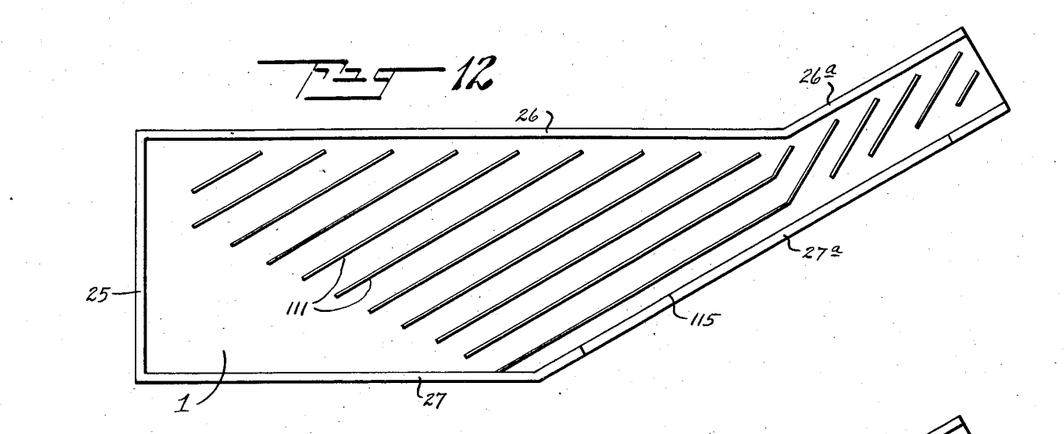
Figs. 12 and 13 are plan views showing the table with modifications of the separating partitions.
Figure 13:
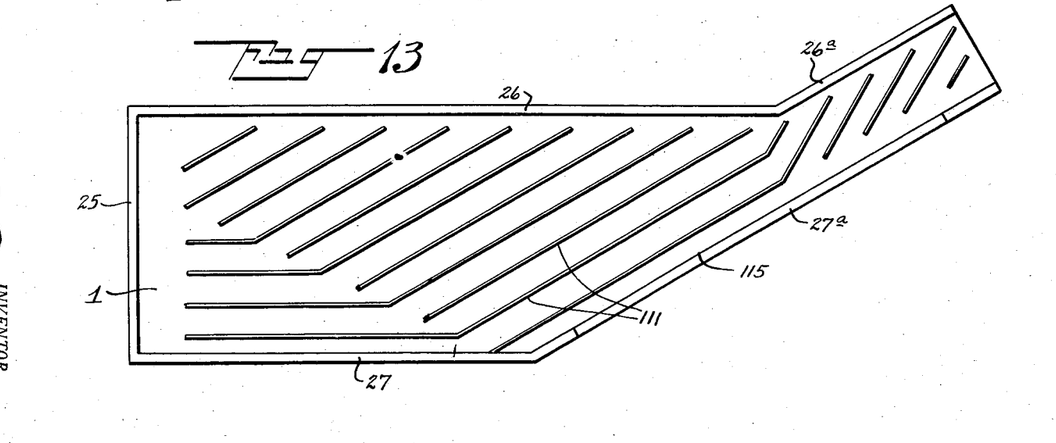

In Figs. 12 and 13 there is shown somewhat diagrammatically two alternative arrangements of the separating partitions, although it will be understoood that the invention in its broader aspects is not limited to any particular and detailed arrangement of these partitions.

In Fig. 12 these partitions at their rearward end are shown beginning at some distance away from the rear end and the rear portion of the short side wall 22, and this arrangement will be found efficient with some kinds and conditions of intermixed materials. In Fig. 13 the separating partitions at the rear of the table, and at the rear end of the partitions are shown with the alternate partitions extending rearwardly substantially longitudinally of the table, and with the intervening partitions terminating adjacent to the angle or turn in the first-mentioned partitions. This arrangement will likewise be found efficient with certain kinds and conditions of intermixed materials. It will be understood, as stated, however, that the location and disposition of the separating partitions may be widely varied so far as concerns certain features of the invention.

The manner of operation of the mechanism described in Figs. 1 to 13 is substantially as follows:

The feed of the intermixed divided materials from the hopper 81 is controlled by regulating the speed of the feed mechanism at the bottom of the hopper so as to primarily built up on the table 1 a bed of materials of such thickness as operates most efficiently and to best advantage for the particular materials used and for this type of table. After the bed is built up of the desired thickness, and the separating operation is fully established, the feed will then be regulated so as to continuously maintain the bed in this condition.

The intermixed materials flow down from the feeding device at the bottom of the hopper, and depending upon the set of the plate 193, the feed may be made heavier at one side of the rear end of the table than the other, and with most materials and under most conditions the feed will be heavier at the lowermost side of the rear end of the table.

The air currents passing upwardly through the table and through the bed of materials will both lift and loosen apart the particles of material, the particles or pieces of the lighter material being buoyed or floated by the air current and the particles of the heavier material coming to rest upon the table. The table is reciprocated longitudinally, and this action tends to progress the entire bed of materials forwardly along the table, and also slides forwardly and sidewise the rock or other heavier material which has come to rest upon the table. The forwardly and transversely inclined separating partitions, however, impel the rock and other settled impurities over to the side of the table and out of the bed, practically as soon as they have settled, and they then form a solid stream of rock flowing along the side edge of the table to the place of discharge. The coal or other lighter material as it is stratified into a superior flotant layer is caused to travel unconstrainedly lengthwise forwardly of the table, which gives a natural and efficient path of movement to this relatively great bulk of the material. This separating action continues progressively along the table as the bed moves forwardly until the separation is completed and all of the rock and impurities comes to rest upon the table and have been impelled out of the bed and in a solid stream forwardly along the side of the table, while all of the coal or other material in a flotant superior layer has passed forwardly to the forward end of the table, and is discharged.

Inasmuch as the rock and impurities in coal generally comprise less than fifteen percent of the total mass, it will be clear that the flotant stratum of purified coal which travels unconstrainedly over the separating partitions will form a bed of considerable thickness with respect to the separating partitions. In practice the depth of the bed will generally be from 4 or 5 to 9 or 10 inches in depth.

By reason of the transversely inclined forward discharge edge for the coal, and the relatively great length thereof, there is no crowding or back pressure upon the stratum of coal which moves naturally to discharge, and this is facilitated also by the fact that this spillage edge of the coal or other stratum extends entirely across the table due to the angled narrow forward edge of the table.

The concentrated stream of rock which is progressed by friction and inertia is easily and readily moved along the angled path at the forward end of the table, and the increased intensity of the air action at this end compensates for the gradually thickening layer of the heavier material. By the setting of the chute 118 and of the gate 126, the discharge flow of the rock and other impurities may be nicely regulated so that all the rock will be discharged and none of the coal or lighter material will be allowed to pass. The gate or gates 134 may also be used and regulated to discharge part of the stream of rock where this may be found advisable or necessary.

Figure 14:
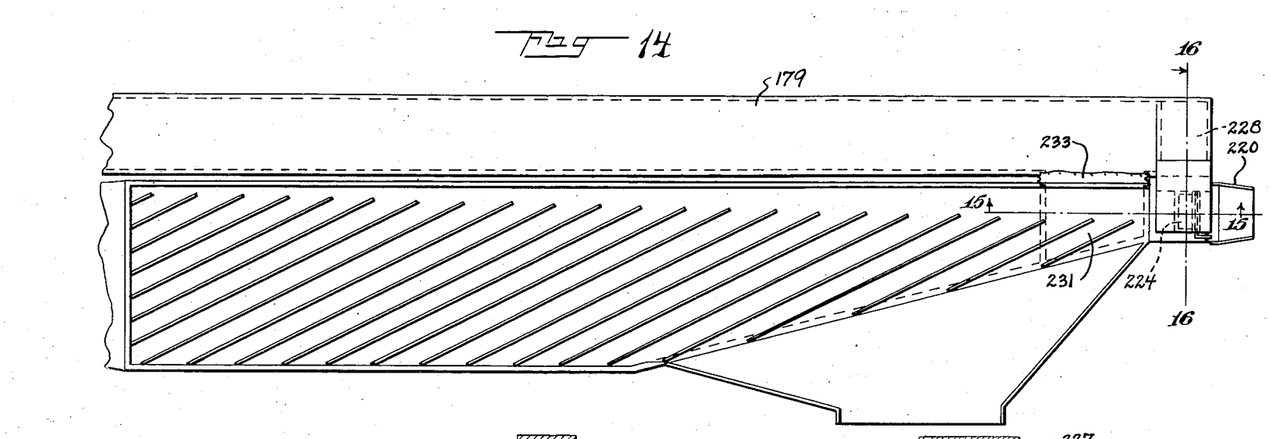
Fig. 14 is a fragmentary top plan, partly diagrammatic, of a modified form of the table.
Figure 15:
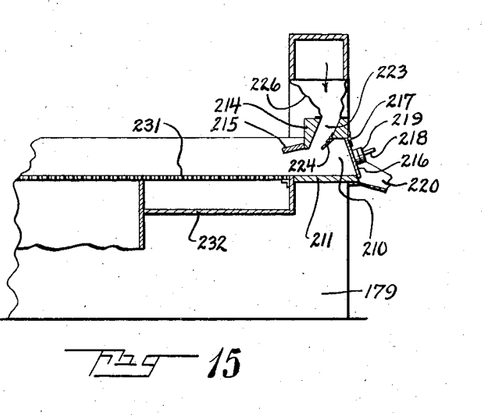
Fig. 15 is a fragmentary, vertical, longitudinal section on line 15—15 of Fig. 14.
Figure 16:
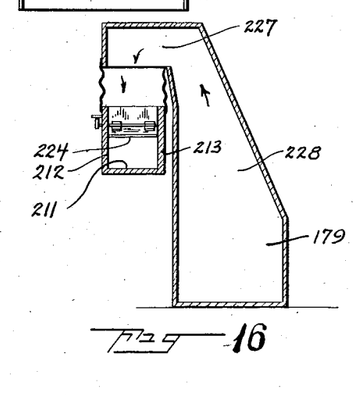
Fig. 16 is a fragmentary, vertical, transverse section on line 16—16 of Fig. 14.

The arrangement and use of the auxiliary air current may be widely varied and with certain kinds or states of intermixed materials may be dispensed with entirely. In Figs. 14, 15 and 16, a further application of the auxiliary air current is shown, and in connection therewith an air-pressure operating control for the discharge of the rock or other heavier material or materials. There is also shown in Fig. 14 a somewhat different form of the front end of the table, and this form will be found suitable and efficient for some kinds and conditions of intermixed materials. It will be understood that the air pressure devices shown in Figs. 14 to 16 may be employed when desired or found advisable with the form of table shown in the preceding figures of the drawings, or both of these may be varied within wide limits.

In Figs. 14, 15 and 16, the preferred embodiment of air-operated discharge regulating means for the heavier material comprises a chamber 210, at the forward end of the table and of the longitudinally-extending rock channel. As embodied this chamber has a preferably air impervious bottom 211, side walls 212 and 213 and a top 214 provided preferably with a rearward extension 215. The front end of the chamber is provided with a discharge gate 216, hinged at its top 217. Means are provided for variably weighing the gate, such as a pin 218 fixed to the gate, on which weights 219 may be placed. A chute 220 may be used to convey the discharged rock to the conveyor belt.

In the present embodiment and in accordance with one aspect of the invention, the air current is introduced from above and blows downwardly and rearwardly within the chamber. An air passage 223 is forced in the top of the chamber, and is preferably provided with an air-regulating valve 224 to control the air-current action within the chamber. The air supply is through a flexible pipe 226 communicating with a branch conduit 227 and 228, which communicates with the front end of the conduit 179.

Thus the rock and other impurities crowding forward within the chamber will open the door 216 when the predetermined pressure is exceeded and be discharged from the table, and a strong air current is blown downwardly and rearwardly within the chamber and will blow backwardly into the bed any coal particles which might still be intermixed with the rock.

In Figs. 14, 15 and 16 there is also shown an area 231 of relatively greatly increased air pressure in the forward end of the air pervious table deck, which may be used as found desirable or efficient. This air current is shown supplied from the conduit 179 by means of a branch conduit 232, with a flexible connection 233. With certain kinds and states of materials it may be found possible to use a uniform air current intensity throughout the entire table area, or to have a very small number of areas of different air current intensities.

It will be understood from all the foregoing that a process and mechanism have been provided realizing the objects and advantages herein stated, together with other objects and advantages; and that changes may be made from the specific procedure and mechanism herein described in detail without departing from the principles of the invention and without sacrificing its chief advantages.

What I claim is:

1. The process of separating intermixed divided materials varying relatively greatly in size and varying relatively little in specific gravities which comprises feeding the intermixed materials onto the rear of an air-pervious table and maintaining a bed of the materials upon the table, and subjecting said bed of materials to recurrent pulsating lifting air currents of substantially uniform intensity throughout the larger part of the area of the bed and subjecting the forward end of the bed to recurrent pulsating lifting air currents of greater intensity and different phase, and longitudinally reciprocating the bed to progressively effect complete stratification and separation of the materials and a flow of the bed along the table.

2. A mechanism for separating intermixed, divided materials varying relatively very greatly in size and varying relatively little in their specific gravities, which comprises an air pervious table, means for separating the materials comprising devices for longitudinally reciprocating the table, and means for feeding the intermixed materials crosswise of the table, and a device suitable to direct a selected part of the crosswise stream of the materials to a selected part of the width of the table.

3. A mechanism for separating intermixed, divided materials varying relatively very greatly in size and varying relatively little in their specific gravities, which comprises an air pervious table, means for separating the materials comprising devices for longitudinally reciprocating the table, and means for feeding the intermixed materials crosswise of the table, and a directing device having its upper and lower ends positionable.

4. A mechanism for separating intermixed, divided materials varying relatively very greatly in size and varying relatively little in their specific gravities, which comprises an air pervious table, means for separating the materials comprising devices for longitudinally reciprocating the table, and means for feeding the intermixed materials crosswise of the table, including a hopper having a feeding device extending substantially across the table and a deflector beneath the feeding device variously positionable to direct the fed materials laterally as well as downwardly.

5. A mechanism for separating intermixed, divided materials varying relatively very greatly in size and varying relatively little in their specific gravities, which comprises an air pervious table, means for separating the materials comprising devices for longitudinally reciprocating the table, and means for feeding the intermixed materials crosswise of the table, including a hopper having a feeding device extending substantially across the table and a deflector beneath the feeding device having both its ends variously positionable to direct the fed materials laterally as well as downwardly.

6. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising devices for impelling the settled heavier material transversely of the table.

7. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising devices for impelling the settled heavier material transversely and from the lower to the upper side.

8. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising separating partitions in inclined position on the table.

9. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising separating partitions inclined forwardly and from the lower side toward the upper side of the table.

10. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising devices for impelling the settled heavier material transversely of the table, and a longitudinally disposed channelway to conduct the settled heavier material forwardly along the side edge of the table by friction and inertia.

11. A mechanism for separating intermixed, divided materials varying relatively very greatly in size and varying relatively little in their specific gravities, which comprises an air pervious table inclined both lengthwise and transversely, means for supplying and maintaining upon the table a bed of materials undergoing separation, including devices positionable to vary the relative amount of intermixed materials fed transversely across the rear end of the table, means for effecting separation of the materials comprising devices for impelling the settled heavier material transversely and from the lower to the upper side, and a longitudinally disposed channelway to conduct the settled heavier material forwardly along the upper side edge of the table by friction and inertia.

RICHARD PEALE.